(12) United States Patent
Trim et al.

(10) Patent No.: US 11,301,594 B2
(45) Date of Patent: Apr. 12, 2022

(54) COGNITIVE SECURITY SYSTEM

(71) Applicant: International Business Machines Corporation, Armonk, NY (US)

(72) Inventors: Craig M. Trim, Ventura, CA (US); Cesar Augusto Rodriguez Bravo, Alajuela (CR); Yered Andres Cespedes Corrales, Heredia (CR); Roxana Monge Nunez, Pérez Zeledón (CR)

(73) Assignee: International Business Machines Corporation, Armonk, NY (US)

( * ) Notice: Subject to any disclaimer, the term of this patent is extended or adjusted under 35 U.S.C. 154(b) by 230 days.

(21) Appl. No.: 16/544,988

(22) Filed: Aug. 20, 2019

(65) Prior Publication Data

US 2021/0056240 A1 Feb. 25, 2021

(51) Int. Cl.
*G06F 21/88* (2013.01)
*G06F 21/35* (2013.01)
*G07C 9/00* (2020.01)

(52) U.S. Cl.
CPC .............. *G06F 21/88* (2013.01); *G06F 21/35* (2013.01); *G07C 9/00309* (2013.01)

(58) Field of Classification Search
CPC ...... G06F 21/88; G06F 21/35; G07C 9/00309
See application file for complete search history.

(56) References Cited

U.S. PATENT DOCUMENTS

| | | |
|---|---|---|
| 5,787,738 A | 8/1998 | Brandt |
| 5,913,907 A | 6/1999 | Lee |
| 6,005,487 A | 12/1999 | Hyatt, Jr. |
| 6,182,481 B1 | 2/2001 | Nagy |
| 6,199,413 B1 | 3/2001 | McDaid |
| 6,474,122 B2 | 11/2002 | Davis |
| 6,513,350 B1 | 2/2003 | Hurd |
| 6,705,133 B1 | 3/2004 | Avganim |
| 6,918,272 B1 | 7/2005 | Sanders |
| 7,140,210 B2 | 11/2006 | Cheng |
| 7,370,499 B1 | 5/2008 | Lee |
| 7,443,665 B2 | 10/2008 | Allen |
| 8,364,138 B2 | 1/2013 | Childs |
| 8,746,021 B2 | 6/2014 | Tao |
| 8,854,207 B2 | 10/2014 | Williams |
| 8,984,653 B2 | 3/2015 | John |
| 9,349,266 B2 | 5/2016 | Stoddard |
| 2005/0002857 A1 | 1/2005 | Pez et al. |

(Continued)

OTHER PUBLICATIONS

"HP (USDT/SFF) Solenoid Lock and Hood Sensor (E0X97AA)", HP, Accessed May 29, 2019, 2 pages, <https://www8.hp.com/emea_africa/en/products/oas/product-detail.html?oid-5383393>.

(Continued)

*Primary Examiner* — Nabil H Syed
(74) *Attorney, Agent, or Firm* — David B. Woycechowsky

(57) ABSTRACT

A computing device controls a physical locking device. The computing device determines that an authorized user has requested an unlocking of a physical security device included in a first computing device. The computing device sends a signal to a mobile computing device of the user that is in communication with the first computing device. The computing device unlocks the physical security device included in the first computing device via the mobile computing device based on the signal.

3 Claims, 9 Drawing Sheets

(56) References Cited

U.S. PATENT DOCUMENTS

| | | | |
|---|---|---|---|
| 2005/0097930 A1* | 5/2005 | Moore | E05B 73/0082 70/58 |
| 2006/0242420 A1 | 10/2006 | Rodriguez | |
| 2008/0110217 A1* | 5/2008 | Andrews | E05B 73/0082 70/58 |
| 2009/0158423 A1* | 6/2009 | Orlassino | G06F 21/32 726/19 |
| 2012/0006080 A1 | 1/2012 | Yu | |
| 2012/0216581 A1 | 8/2012 | Tsai | |
| 2014/0000322 A1* | 1/2014 | Williams | E05B 73/0011 70/18 |
| 2014/0026625 A1 | 1/2014 | Wu | |
| 2015/0278556 A1* | 10/2015 | Avni | G06F 21/81 726/35 |
| 2015/0347738 A1* | 12/2015 | Ulrich | G06F 21/35 726/17 |
| 2016/0123043 A1* | 5/2016 | Tan | G06F 1/16 361/679.57 |
| 2020/0349786 A1* | 11/2020 | Ho | G06K 9/00288 |

OTHER PUBLICATIONS

"Installing an HP Solenoid Lock and Hook Sensor", HP, © 2004-2010 Hewlett-Packard Development Company, L.P., 6 pages.

"Master Access Lock Management Options", Kensington, Accessed on Jul. 8, 2016, 3 pages, <https://web.archive.org/web/20160708064751/http://kensington.com/en/fi/master-access-solutions>.

"Security", Kensington, Accessed on Jul. 30, 2016, 3 pages, <https://web.archive.org/web/20160730053149/https://www.kensington.com/en/fi/4651/security>.

Disclosed Anonymously, "Alternative Physical Lock for Laptops", An IP.com Prior Art Database Technical Disclosure, IP.Com No. IPCOM000243777D, Electronic Publication Date Oct. 16, 2015, 4 pages.

Disclosed Anonymously, "Method and Framework for Cognitive Locking, Protection and Sharing of Devices", An IP.com Prior Art Database Technical Disclosure, IP.com No. IPCOM000249519D, Electronic Publication Date Mar. 2, 2017, 7 pages.

* cited by examiner

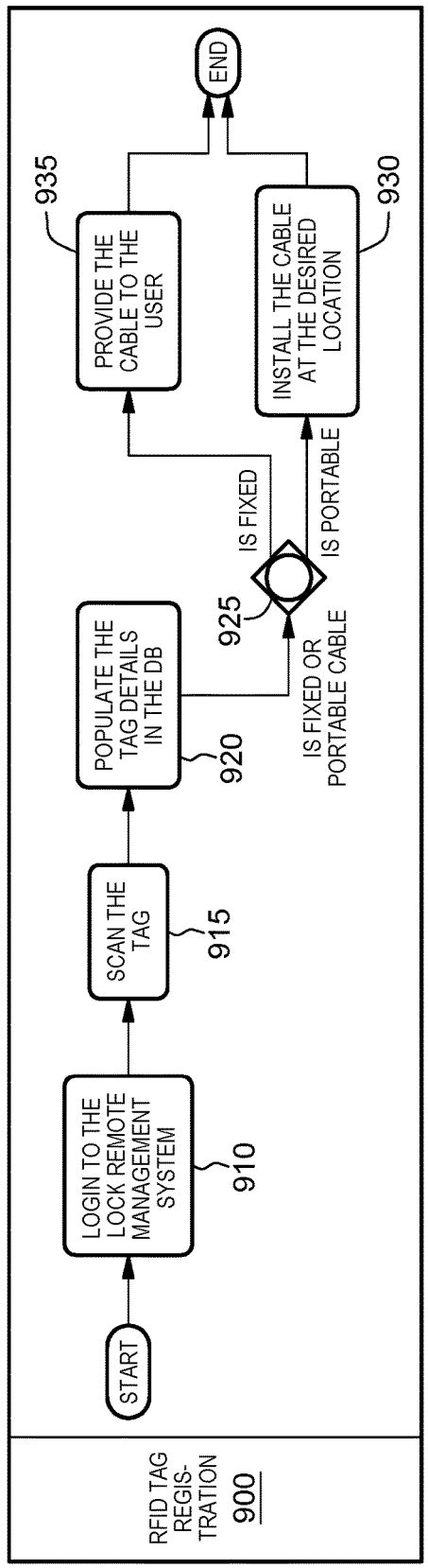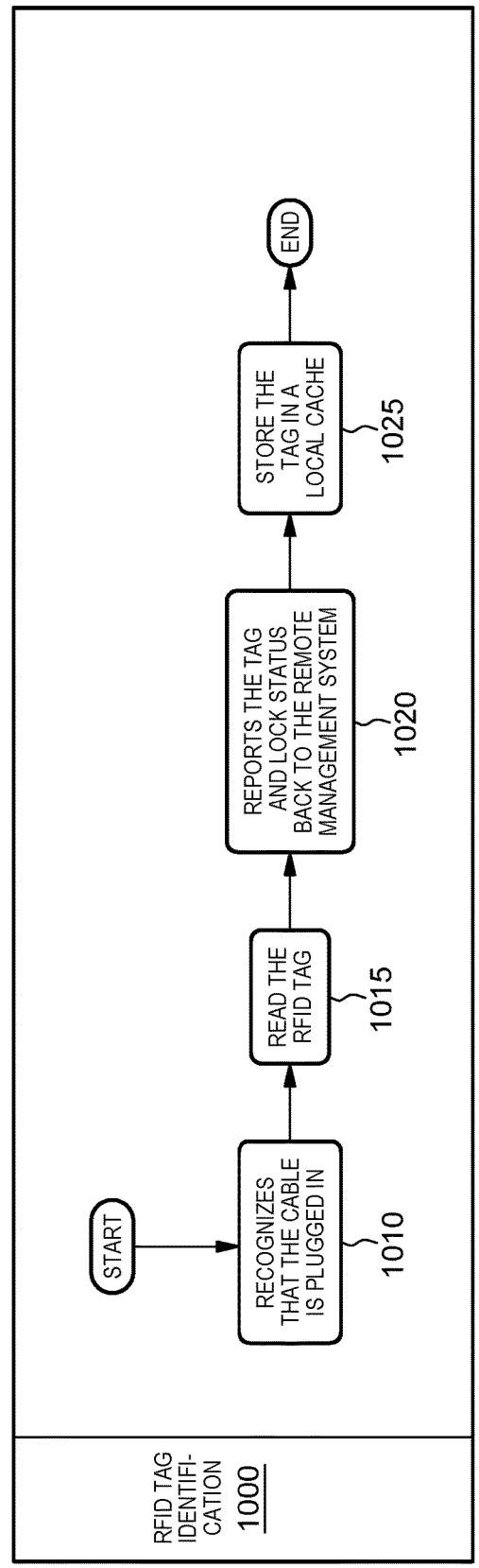

COGNITIVE SECURITY SYSTEM

BACKGROUND

The present invention relates generally to the field of security, and more particularly to security devices and software.

Many businesses have a large number of computing devices to keep track of. Each of these computing devices can have a variety of software and data that can include confidential information. In many scenarios, the loss or unauthorized removal of a computing device may place that software and data at risk of being accessed or otherwise divulged to unauthorized third parties.

SUMMARY

One aspect of the invention provides a computer implemented method. The method comprising: determining, at least one computer processor, that an authorized user has requested an unlocking of a physical security device included in a first computing device; sending, by the at least one computer processor, a signal to a mobile computing device of the user that is in communication with the first computing device; and unlocking, by the at least one computer processor, the physical security device included in the first computing device via the mobile computing device based on the signal.

Another aspect of the invention provides a computer program product embodied as program instructions stored on a computer readable storage medium. The program instructions comprising instructions to cause a computing device to perform a method, the method comprising: determining, at least one computer processor, that an authorized user has requested an unlocking of a physical security device included in a first computing device; sending, by the at least one computer processor, a signal to a mobile computing device of the user that is in communication with the first computing device; and unlocking, by the at least one computer processor, the physical security device included in the first computing device via the mobile computing device based on the signal.

Another aspect of the invention provides a computer system. The computer system including program instructions stored on a computer readable storage medium that, when executed by the computer system, causes the computer system to perform a method, the method comprising: determining, at least one computer processor, that an authorized user has requested an unlocking of a physical security device included in a first computing device; sending, by the at least one computer processor, a signal to a mobile computing device of the user that is in communication with the first computing device; and unlocking, by the at least one computer processor, the physical security device included in the first computing device via the mobile computing device based on the signal.

Still yet, any of the components of the present invention could be deployed, managed, serviced, etc., by a service provider who offers to implement controlling a physical locking device in a computer system. Embodiments of the present invention also provide and encompass related systems, methods, and/or program products.

BRIEF DESCRIPTION OF THE DRAWINGS

These and other features of this invention will be more readily understood from the following detailed description of the various aspects of the invention taken in conjunction with the accompanying drawings.

FIG. 9 illustrates operational processes for radio frequency identification (RFID) tag registration for a lock program, executing on a computing device within the environment of FIG. 8, in accordance with an exemplary embodiment of the present invention;

FIG. 10 illustrates operational processes for RFID tag identification for a lock program, executing on a computing device within the environment of FIG. 8, in accordance with an exemplary embodiment of the present invention;

DETAILED DESCRIPTION

Figure 1:
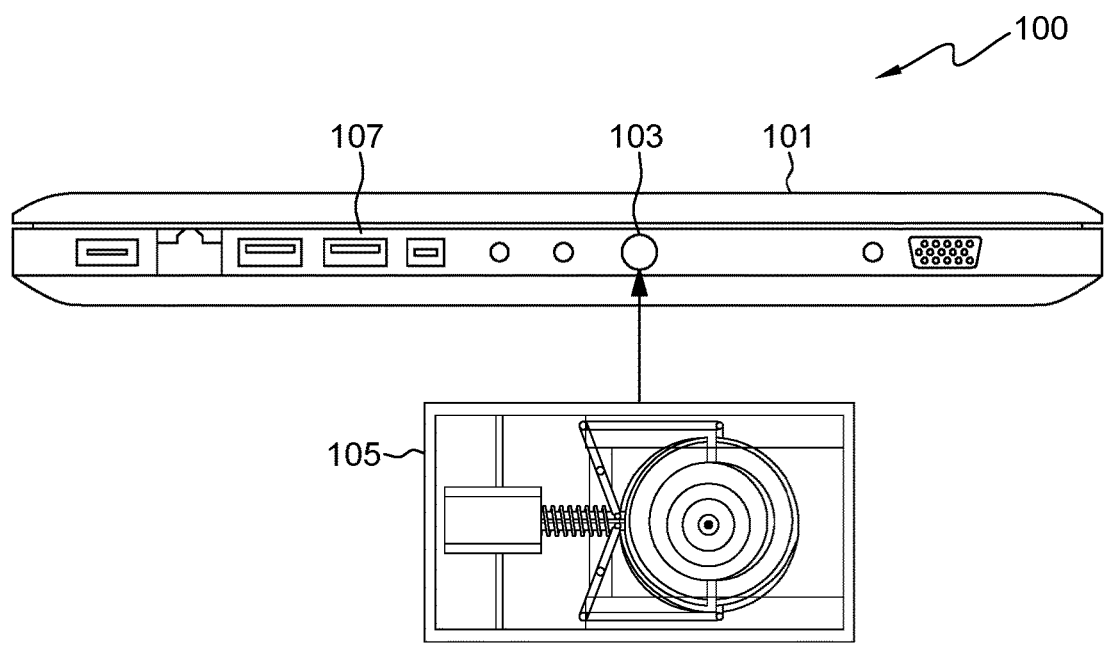
FIG. 1 is an exterior view, 100, of a computing device 101 that includes a security device 105 that is accessible via access port 103.

Detailed embodiments of the present invention are disclosed herein with reference to the accompanying drawings. In the drawings, like numbering represents like elements. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the present invention recognize that physical security is one of the first layers in information security. Embodiments of the present invention recognize that organizations often make investments in equipment and software to secure their computers and other computing related devices. Some statistics conclude that 40% of the laptops that are stolen are (i) stolen at the office, and (ii) that 97% of all stolen laptops are never recovered.

Embodiments of the present invention recognize that the risk of exposing client data and the fines related to that exposure may cost a given company millions of dollars. Further, such exposure may put trade secrets and intellectual capital at risk. Embodiments of the present invention recognize that one common method for securing laptops computers relies on laptop locks. Embodiments of the present invention recognize that such locks are based either on a physical key or a combination. Embodiments of the present invention recognize the existence of pain points related to the use of locks is the management of the keys or codes. For example, if the user loses a key to a laptop lock then there are two issues: (i) the cost of replacing the key and sometimes the lock (since with some keys, replacement is not possible) and (ii) the risk that a third party may now have access to a key and may use that key to open the lock at a later time and remove the laptop without authorization. These risks increase if the key is able to open multiple locks. Further, if a master key is used for multiple locks, then this simplifies the security solution since a single administrator is able to effectively manage all of those locks with that one key as opposed to having multiple different keys for the various locks.

Embodiments of the present invention provide a solution that enables administrators to efficiently and digitally manage such locks remotely. Some embodiments provide a hybrid lock which has the structure and the capabilities for being managed remotely but also to trigger or execute security actions. For example, such security actions may include sending warnings to other devices (e.g. cellphones) and/or individuals (e.g. IT Department administrators) based on user/organization's established rules. Some embodiments provide a hybrid lock that has cognitive features for monitoring and managing lock's status (open and close) remotely, but also to execute security actions when a risk or an abnormal pattern is identified. Some embodiments provide an internet of things (IoT) solution that provides monitoring and security for devices. Some embodiments provide a solution that leverages cloud infrastructure to support monitoring and security for devices.

Some embodiments provide a management system to remotely control/manage/review the status of hybrid electronic locks. Some embodiments provide a system that combines a combination of two or more selected from: user profiles, security profiles, assigned locks and opening methods to provide a hybrid solution to physically lock devices. Some embodiments provide a system that creates reports and statistics on the usage/status/features/characteristics and other data related to the hybrid lock. Some embodiments provide a cognitive system that creates patterns and triggers a plurality of actions/alerts based on a plurality of user attributes like user profile, security profile, assigned lock, assigned cable, user location, usage, etc., to create a more secure and tailored security (locking) solution. Some embodiments provide a hybrid lock which has the structure and the capabilities for being managed remotely but also to trigger or execute security actions (e.g., send warnings to another device (e.g., cellphones) or systems (e.g., IT Department) based on user/organization's established rules. Some embodiments provide a solution to secure one or more devices that must be left alone with the option to continuously monitor its physical security.

The present invention will now be described in detail with reference to the Figures.

FIG. 1 is an exterior view, 100, of a computing device 101 that includes a security device 105 that is accessible via access port 103. In this embodiment, security device 105 is an internal component of computing device. Computing device 101 further includes connection port 107 that can be used to connect another computing device to computing device 101. For example, connection port 107 is a USB connection port that is connected to a smart phone via a USB cable. In general, security device 105 is a device that forms a mechanical union between computing device 101 and a security cable in accordance with an embodiment. In general, security device 105, is in communication with computing device 101 and is configured to report changes in signal from a retaining device that attaches to the security device 105. Security device 105 is described in greater detail hereinafter with reference to at least FIGS. 3 and 4 and with respect to FIG. 2.

Figure 2:
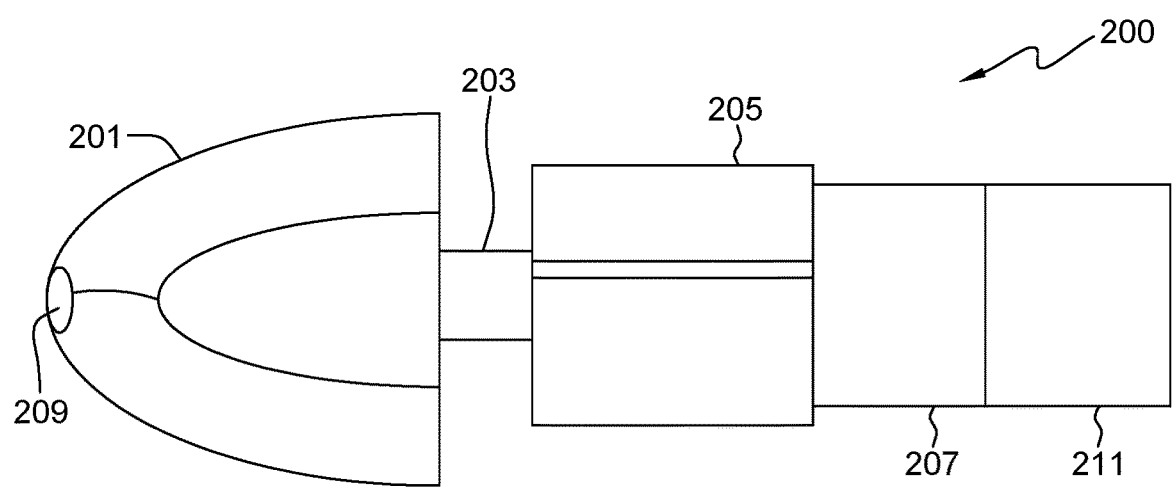
FIG. 2 is a perspective view of various components included in one embodiment of a retaining device that attaches to the security device of FIG. 1 and a base.

FIG. 2 is a perspective view of various components included in one embodiment of a retaining device 200 that attaches to the security device 105 of FIG. 1 and a base 211. While certain description herein may address the connection formed between security device 105 and retaining device 200, it is to be understood that such description may further include and apply to a connection formed between retaining device 200 and base 211. While one example of retaining device 200 and security device 105 are presented in FIGS. 2-4, one having ordinary skill in the art readily recognizes that many options exist for such devices within the scope of the instant invention and embodiments are not limited to only those of FIG. 2-4. As such, embodiments encompass a variety of complementary clamping/locking devices as are understood by those having ordinary skill in the art.

Security device 105 is configured to receive and mechanically lock onto retaining device 200. Retaining device 200 includes head portion 201, neck portion 203 and transmitter portion 205 that are affixed to cable segment 207. In general, a connection being formed between retaining device 200 and security device 105 forms an electrical connection and allows determination of unauthorized removal of computing device 101 by detection of signal changes. In one embodiment, an electrical signal is sent along the length of cable segment 207. In one embodiment, in the event that cable segment 207 is severed, the loss of the signal is readily detectable by security device 105.

In one embodiment, transmitter portion 205 includes a radio frequency identification (RFID) tag that is activated upon detection of an electrical connection being formed or lost between retaining device 200 and security device 105. In one such embodiment, transmitter portion 205 includes an encryption/decryption chip that sends signals to computing device 101 via security device 105, which may also include an embedded microchip, to inhibit bypassing of the electrical connection between retaining device 200 and security device 105. For example, security device 105 sends an encrypted signal to retaining device 200, which decrypts the signal and sends a return encrypted signal to security device 105. As such, the system can confirm the electrical connection between retaining device 200 and security device 105. Embodiments, recognize that embedded microchip encryption and decryption technology is understood by one having ordinary skill in the art.

In this embodiment, cable segment is affixed to base 211, which is configured to ensure that retaining device 200 is not readily removed, i.e., base 211 anchors computing device 101 to a location via retaining device 200 being plugged into security device 105 and base 211. In some embodiments, retaining device 200 is permanently fixed to base 211. In other embodiments, retaining device 200 is removable from base 211, which may add a layer of redundancy to the system. For example, in the event of a mechanical failure of security device 105 in computing device 101, where security device 105 is not responsive/unable to release retaining device 200, base 211 may activate a release of retaining device 200 allowing computing device 101 to be removed and sent for repair.

In general base 211 is an object that is not readily movable by a human or is difficult to move, such as a large table or another bulky or heavy object. In some embodiments, base 211 is a port, similar to access port 103 of FIG. 1, that is built into a wall such that retaining device 200 may be affixed to a building, such as an office wall or a post, via the connection with base 211. In some embodiments, retaining device 200 includes two sets of head portion 201, neck portion 203, and transmitter portion 205 that are respectively affixed to each end of cable segment 207, such that one end mirrors the other.

As such, in some embodiments, the end of retaining device 200 that plugs into base 211 has similar features and functionality to the end of retaining device 200 that plugs into security device 105. Therefore, the description of the mechanical operation and components of security device 105 may be applied to select embodiments of base 211 and the abutment of cable segment 207 and base 211 depicted in FIG. 2 represents a mechanical union and electrical connection formed between a set of head portion 201, neck portion 203, and transmitter portion 205 that are plugged into base 211, similar to the connection formed by plugging retaining device 200 into security device 105.

In one embodiment, one or both of security device 105 and base 211 forms an electrical connection between two wires included in retaining device 200. For example, two insulated wires that are wrapped in a protective cut/sever resistant sheath such as, but is not limited to, a covering of woven steel wire. As such, it is readily determined whether or not retaining device 200 is properly attached to one or both of security device 105 and base 211 by the completion of the circuit and detection of the required signals. One having skill in the art recognizes that many options may be implemented within the scope of this disclosure that provide for one or both of the (i) detection of proper connection between various components and (ii) the status (e.g. cut or un-cut) of a retaining device 200.

In general, neck portion 203 is of a smaller diameter when compared to head portion 201. This difference is diameter prevents ready removal of retaining device 200 when retaining device 200 is locked into position by security device 105. As such, when retaining device 200 is locked into position by security device 105, computing device 101 is secured to a given location and is not readily removed by force. In general, the length of cable segment 207 dictates the distance computing device 101 can be moved when computing device 101 is secured by retaining device 200.

As depicted in FIG. 2, head portion 201 includes a connection port 209 that is configured to receive an electrical connector that is included in security device 105. As such, when retaining device 200 is plugged into security device 105, this electrical connector is inserted into head portion 201. In one embodiment, Further details of this connection and its functionality are further described in the discussion of FIGS. 3-12.

Embodiments of the present invention recognize that while certain embodiments include a laptop or another computing device, the invention is not limited thereto. Embodiments of the present invention encompass any combination of components that are configured to control the remote unlocking and locking of security devices. In some embodiments, security device 105 is a standalone device that has one end of retaining device 200 affixed to security device 105, either directly or indirectly and that the other end of retaining device 200 can be plugged into, and secured by, security device 105. In some such embodiments, security device 105 includes connection port 107 (see FIG. 12 for further details). In other words, security device 105 is incorporated into base 211. In some embodiments, computing device 101 includes base 211 such that computing device 101 may be secured to another object via retaining device 200 being wrapped around and/or passed through that object and locked into place via security device 105.

Figure 3:
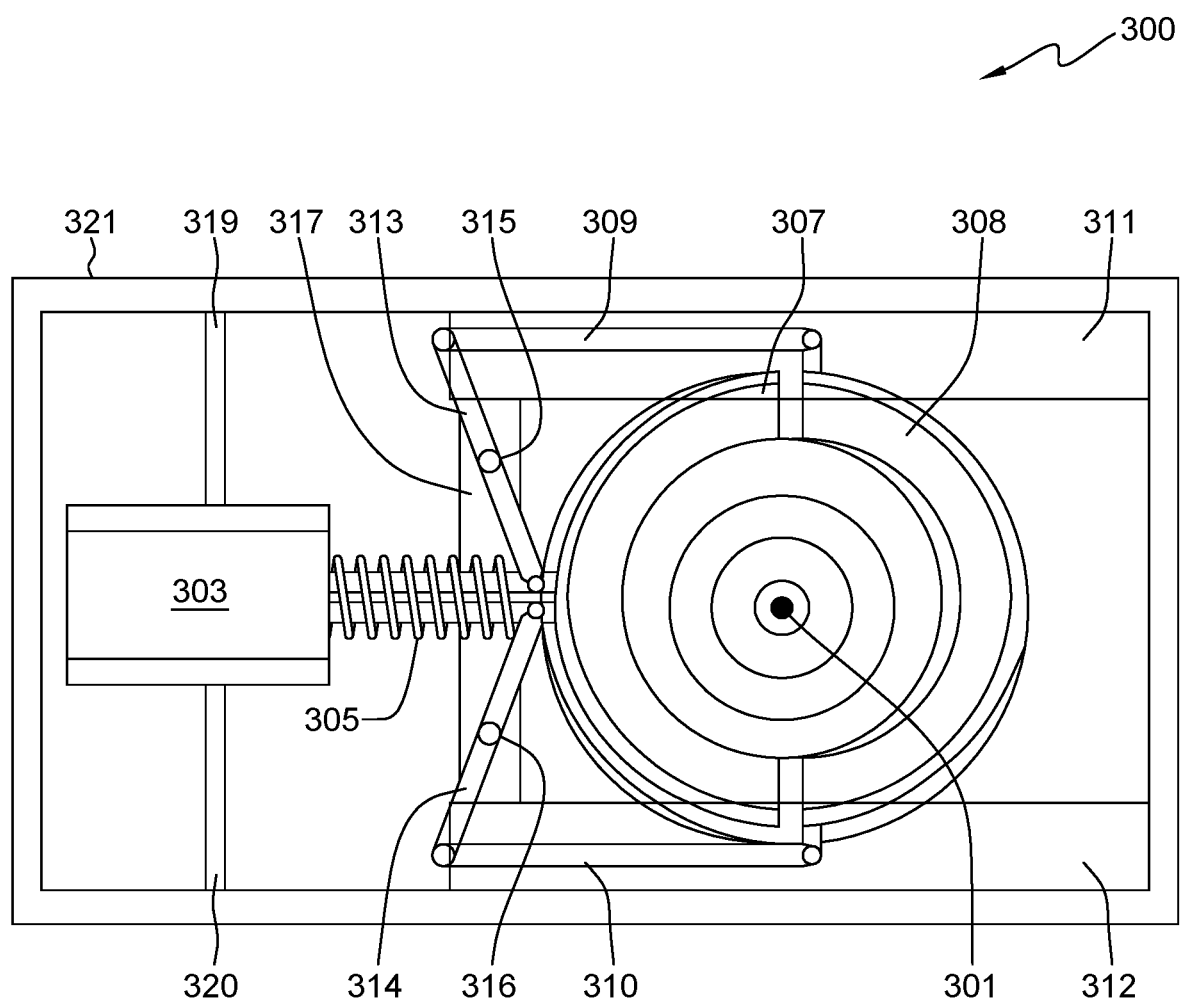
FIG. 3 is a planar view of various components included in one embodiment of the security device of FIG. 1.

FIG. 3 is a planar view, 300, of various components included in one embodiment of the security device 105 of FIG. 1. As depicted, security device 105 includes collar portions 307 and 308, as well as an external frame 321 with support brackets 317, 319, and 320, where support brackets 319 and 320 are affixed to an actuator 303. Actuator 303 includes and arm (not numbered for clarity of the figures) that is encompassed by spring 305 and is attached to collar portion 307. As such, when actuator 303 is activated, the arm is retracted, which places a compressive load on spring 305. When actuator 303 is de-activated, the compressive load on spring 305 pushes the arm out and away from actuator 303. As is depicted, the end of the arm of actuator 303 is affixed to pivot arms 313 and 314, which are in turn attached to slide arms 309 and 310. As is depicted, pivot arms 313 and 314 respectively pivot on pivot pins 315 and 316. As is readily understood, when actuator 303 is activated, the arm is retracted which in turn causes pivot arms 313 and 314 to pivot and push slide arms 309 and 310 away from actuator 303. As is shown, slide arms 309 and 310 are in turn affixed to collar portion 308 and their lateral movement is guided by guides 311 and 312. As such, when actuator 303 is in an activated state, collar portions 307 and 308 move away from one another to yield an opening large enough to permit entry and/or removal of head portion 201 of retaining device 200.

It is to be understood that the inner diameter of a ring, formed by the closure of collar portions 307 and 308 when actuator 303 is in a de-activated state, is smaller than head portion 201 but is large enough to encompass neck portion 203. As such, closure of collar portions 307 and 308 around neck portion 203 forms a mechanical connection between retaining device 200 and security device 105.

In some embodiments and scenarios, it is understood that when actuator 303 is in an de-activated state, head portion 201 of retaining device 200 can be pressed into access port 103, i.e., into the opening of retaining device 200, and collar portions 307 and 308 can be forced to move away from one another to yield an opening large enough to permit entry of head portion 201 of retaining device 200. It is to be noted that the head portion 201 of retaining device 200 can be tapered to facilitate such functionality. As such, retaining device 200 can be attached to computing device 101 without the activation of actuator 303.

Figure 4:
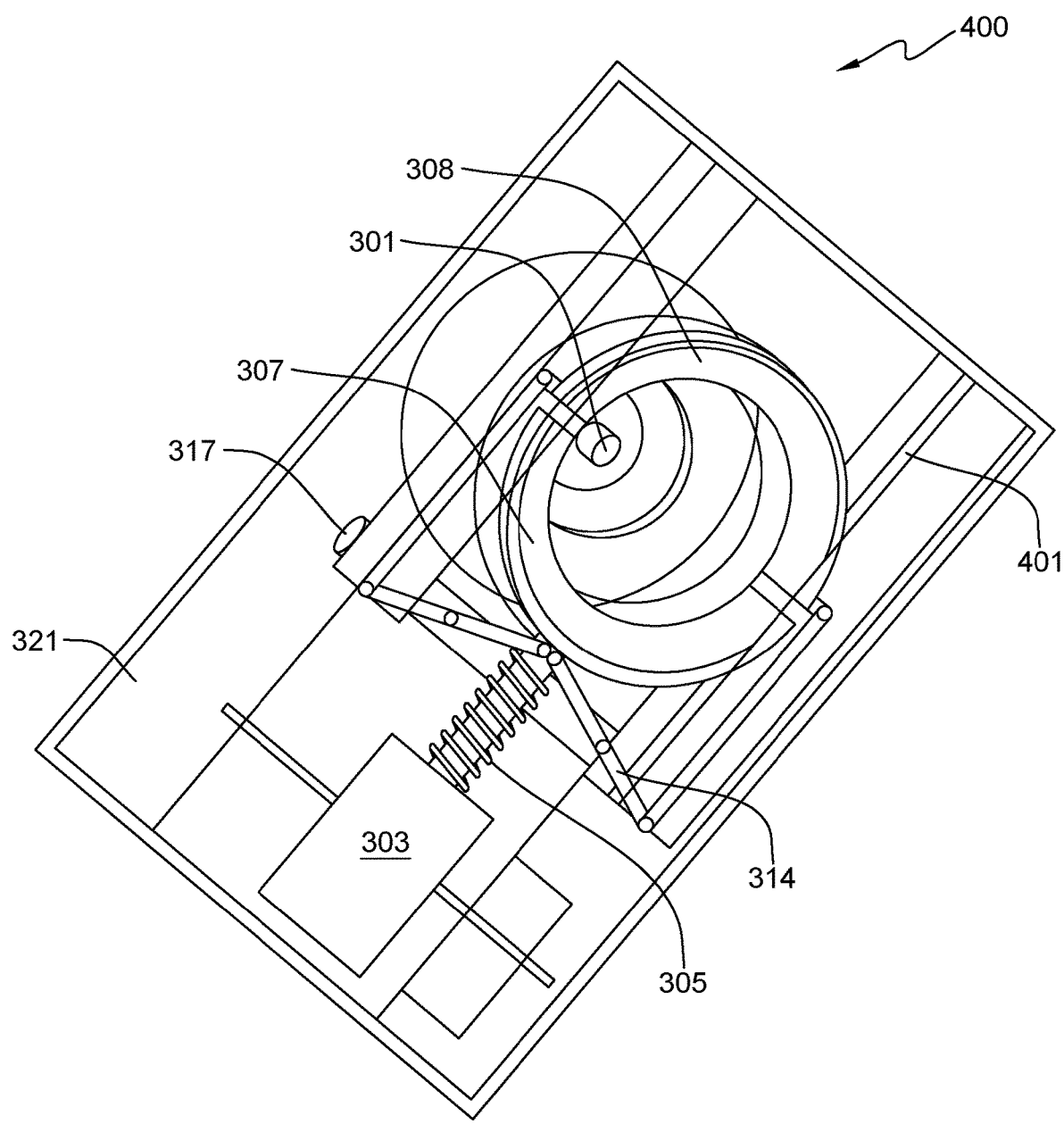
FIG. 4 is a perspective view of various components included in one embodiment of the security device of FIG. 1.

It is to be noted that, as shown in FIGS. 3 and 4, retaining device 200 includes pin 301, an electrical connector, that is configured to form an electrical connection with head portion 201, via connection port 209. As such, when retaining device 200 is inserted into access port 103, an electrical connection is formed between computing device 101 and retaining device 200 via security device 105.

FIG. 4 is a perspective view, 400, of various components included in one embodiment of the security device 105 of FIG. 1. FIG. 4 illustrates slot 401 in guide 312, which encompasses part of pivot arm 314 and all slide arm 310. It is to be understood that, while not shown, a corresponding slot exists in guide 311, which encompasses part of pivot arm 313 and all slide arm 309. It is also noted that the position of support bracket 317 near the end of guides 311 and 312 provides additional stability and mechanical strength to security device 105 such that the ends of guides 311 and 312 are braced and are more difficult to bend in a scenario where an individual attempts to forcefully remove retaining device 200 from security device 105. Also noted is that the other end of guides 311 and 312, which are farthest away from actuator 303, are affixed to external frame 321.

Figure 5:
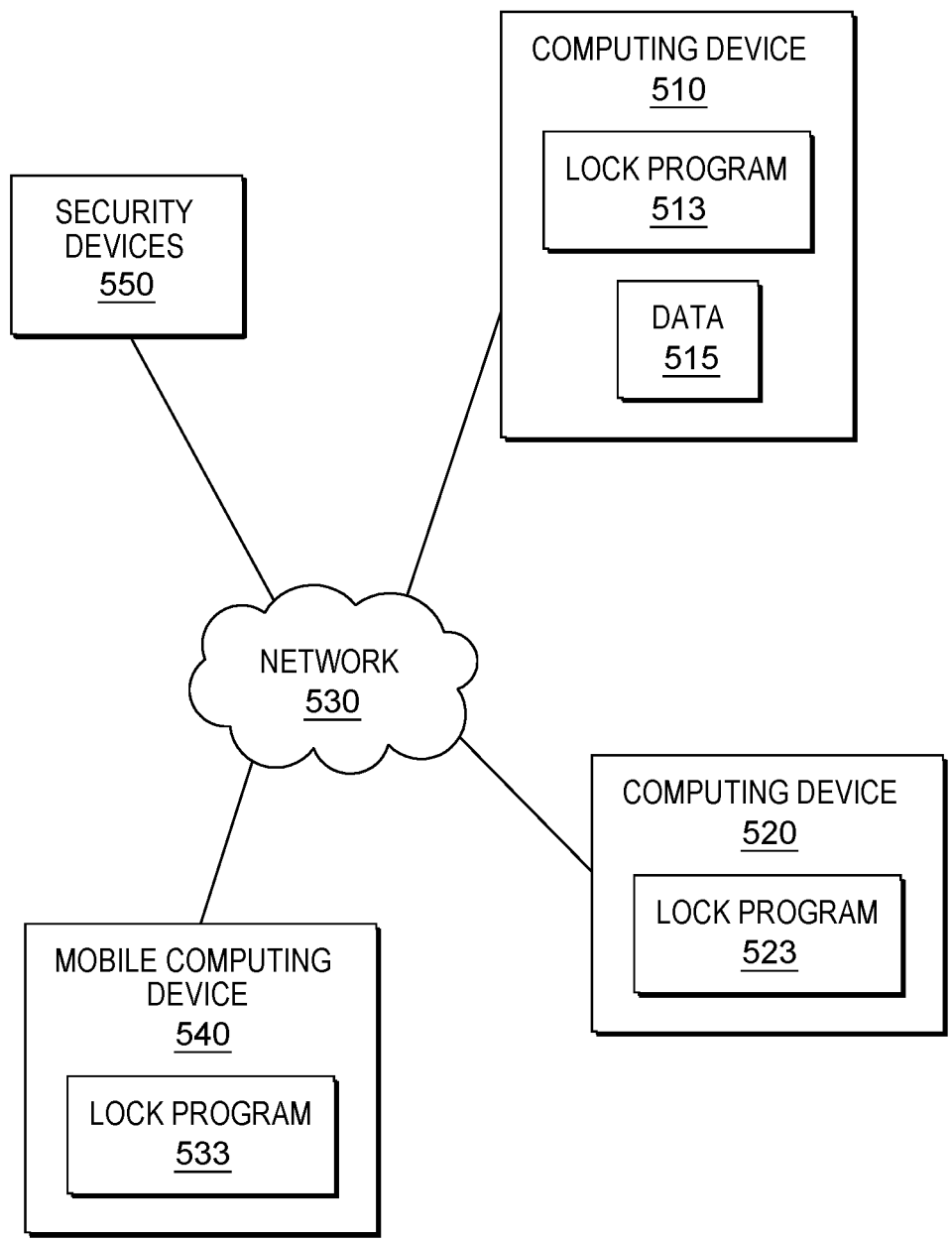
FIG. 5 is a functional block diagram illustrating a lock control environment, generally designated 500, in accordance with one embodiment of the present invention.

FIG. 5 is a functional block diagram illustrating a lock control environment, generally designated 500, in accordance with one embodiment of the present invention. Lock control environment 500 includes security devices 550 and a variety of computing devices, including computing device 510, computing device 520, and mobile computing device 540, connected over network 530. Computing device 510 includes lock programs 513 and data 515. Computing device 520 includes lock programs 523. Mobile computing device 540 includes lock program 533. Security devices 550 includes, but is not limited to, security device 105, retaining device 200 and base 211. In some embodiments, security devices 550 represents a set of security devices, which may be distributed or stored in a central location. For example, a stock of retaining device 200 in a storeroom, a set of security device 105 included in a set of computing devices 101, and a set of bases 211 that are distributed throughout a building.

While security devices 550 are depicted as being separate from computing device 510, computing device 520, and mobile computing device 540 it is understood that one or more such security devices may be physically incorporated as part of computing device 510, computing device 520, and mobile computing device 540 in accordance with a given embodiment. For example, computing device 520 is a computing device 101 and includes security device 105 attached to retaining device 200, which is attached to base 211. As such, FIG. 5 is to be understood to include all of the various hardware and software elements of FIGS. 1-4 and 6-12 in accordance with the various embodiments described herein.

In various embodiments of the present invention, each of computing device 510, computing device 520, and mobile computing device 540 is a computing device that can be a standalone device, a server, a laptop computer, a tablet computer, a netbook computer, a personal computer (PC), or a desktop computer. In another embodiment, computing device 510, computing device 520, and mobile computing device 540 each represent a computing system utilizing clustered computers and components to act as a single pool of seamless resources. In general, each of computing device 510, computing device 520, and mobile computing device 540 can be any computing device or a combination of devices with access to lock programs 513, 523 and 533, and data 515 and is capable of executing lock programs 513, 523 and 533. Each of computing device 510, computing device 520, and mobile computing device 540 may include internal and external software and hardware components, as depicted and described in further detail with respect to FIGS. 1-4 and 6-12.

In this exemplary embodiment, lock programs 513, 523 and 533, and data 515 are respectively stored on computing device 510, computing device 520, and mobile computing device 540 as illustrated. However, in other embodiments, each of lock programs 513, 523 and 533, and data 515 may be stored externally and accessed through a communication network, such as network 530. Network 530 can be, for example, a local area network (LAN), a wide area network (WAN) such as the Internet, or a combination of the two, and may include wired, wireless, fiber optic or any other connection known in the art. In general, network 530 can be any combination of connections and protocols that will (i) support communications between each of computing device 510, computing device 520, and mobile computing device 540, and (ii) provide access to lock programs 513, 523, and 533, and data 515, in accordance with a desired embodiment of the present invention.

In one exemplary embodiment, lock programs 513, 523 and 533, include a number of program modules that, when executed by computing device 510, computing device 520, and/or mobile computing device 540, are configured to cause the execution of various functions, some of which are described in further detail in the description of FIGS. 8-11, and otherwise herein.

In one exemplary embodiment, data 515 includes: user profiles, user activity patterns, trigger actions based on the user profiles, copies of digital keys/codes, records associated with each retaining device 200, security device 105/computing device 101, and base 211. In various embodiments and scenarios, the information stored in data 515 is leveraged to monitor and control the security/lock status of various computing devices within the environment of FIG. 5. Further details are provided hereinafter with respect to FIG. 6.

Figure 6:
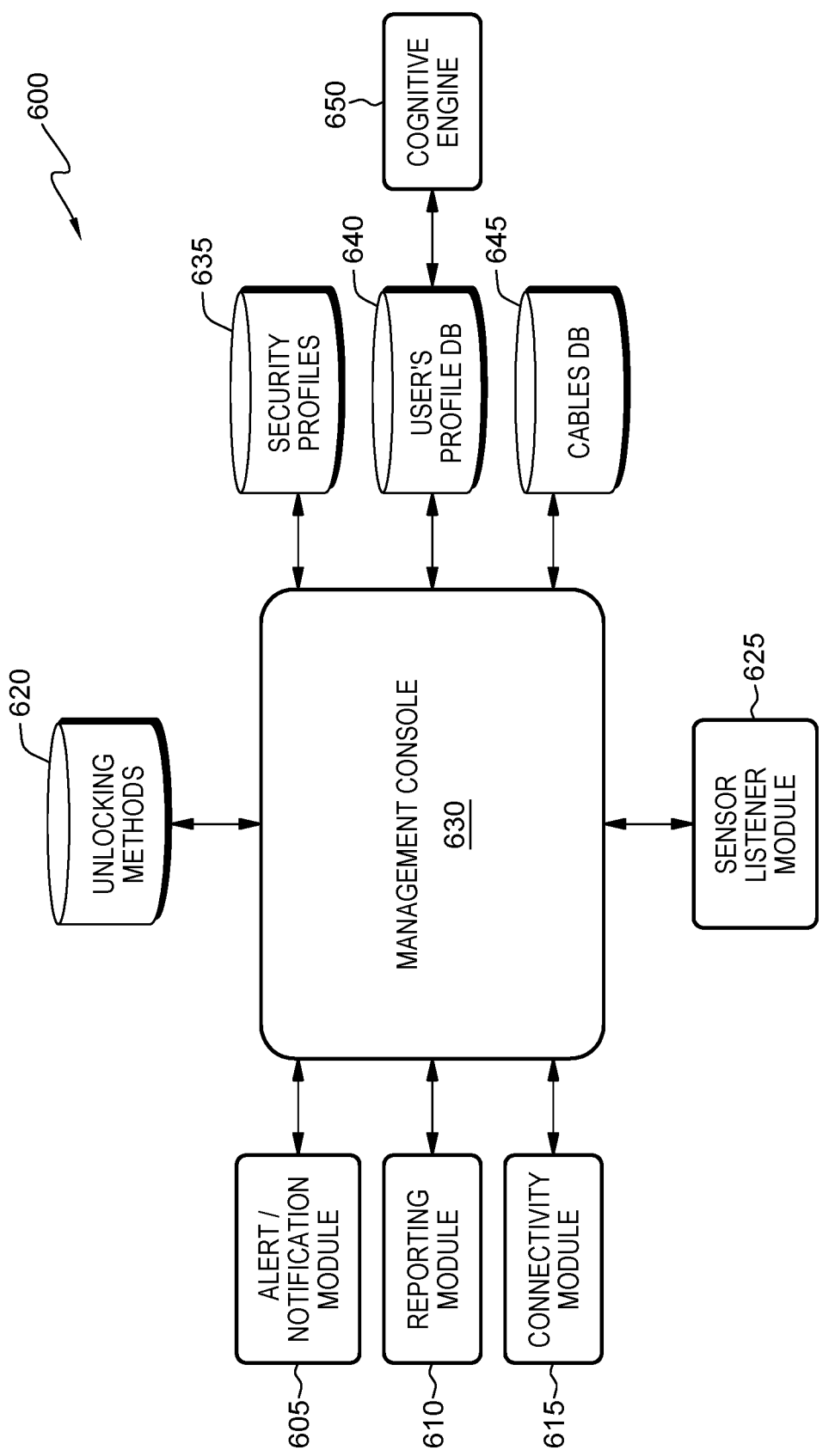
FIG. 6 is a block component diagram illustrating certain communication pathways, hardware components, and software components included in various computing systems of FIG. 5.

FIG. 6 is a block component diagram, 600, illustrating certain communication pathways, hardware components, and software components included in various computing systems of FIG. 5. The depicted components represent a hybrid lock system which has the structures and capabilities to provide remote management of such locks and also triggers to execute security actions (e.g., send warnings to another device (e.g., cellphones) or systems (e.g., IT Department)) based on a given set of established rules/security protocols. In general, management console 630 represents a management system that remotely controls/manages/reviews the status of hybrid electronic locks in the environment of FIG. 5. As shown in FIG. 6, a management console 630 is in communication with alert/notification module 605, reporting module 610, connectivity module 615, sensor listener module 625, and cognitive engine 650, and has access to data included in data 515, which further includes unlocking methods 620, security profiles 635, user's profile db (database) 640, and cables db (database) 645. FIG. 6 depicts a system that combines user profiles, security profiles, assigned locks and opening methods to provide a hybrid solution to physically lock devices.

In one embodiment, unlocking methods 620 is a set of rules that govern the unlocking and locking of various security devices 550. In some embodiments, these rules are customized at setup by a user, such as, for example an IT administrator. In some embodiments, these rules are, at least in part, modified based on results generated by cognitive engine 650.

In one embodiment, security profiles 635 are a set of profiles for one or both of security devices 550 and computing device 510, computing device 520, and mobile computing device 540. Security profiles 635 includes information that can be used to identify and verify security devices 550 and computing device 510, computing device 520, and mobile computing device 540. For example, in the scenario where a request is received from a mobile device to unlock a security device 105 to release retaining device 200, management console 630 accesses unlocking methods 620, security profiles 635, user's profile db (database) 640, and cables db (database) 645 to verify not only the identity of the mobile device (to confirm that the device is authorized to request the unlock) but to further verify that such a request is in compliance with the rules included in unlocking methods 620.

In one embodiment, user's profile db (database) 640, includes information about each registered user that is authorized to request a lock program executing on management console 630 to execute various lock and unlock actions. Such information may include required passwords or other verifications that convey authorization to the user. In some embodiments, user's profile db (database) 640 further includes data that defines a pattern of expected behavior of the user. For example, a user often works late, as such, a request for an unlock action during those hours is within a pattern of behavior for the user that is generated by cognitive engine 650 and thus does not trigger an alert. In another example, a request is received at 4 a.m., which is outside of the expected work hours for that user, and the request does trigger an alert.

In one embodiment, cables db (database) 645 is a set of historical data related to various cables and other security devices, included in security devices 550. In general, cables db (database) 645 includes security override passwords and the history of usage associated with each security device. When a lock release is authorized, a lock program executing on management console 630 accesses the information stored in cables db (database) 645 and sends that information to the required security device, which triggers the unlocking process.

In general, alert/notification module 605, reporting module 610, connectivity module 615, sensor listener module 625, and cognitive engine 650 are program modules that, when executed, carry out various functions of lock programs 513, 523, and 533.

In one embodiment, alert/notification module 605 sends alerts and notifications to one or both of users and administrators associated with computing device 510, computing device 520, and mobile computing device 540. For example, in response to a signal indicating an improper connection between security device 105 and retaining device 200, alert/notification module 605 sends alert to the mobile computing device 540 of a user and conveys to the user the existence of the improper connection between security device 105 and retaining device 200. In another example, computing device 510 functions as the management console 630 and computing device 520 is a computing device 101. In this example, computing device 510 receives and processes information from computing device 101 and determines that the result indicates that there has been an unauthorized movement of computing device 101 from a first location to a second location and that retaining device 200 has been severed. As such, alert/notification module 605 sends alerts and notifications to one or both of users and administrators associated with computing device 101 indicating the situation.

In one embodiment, reporting module 610 creates reports and statistics on the usage/status/features/characteristics and other data related to the hybrid locks included in security devices 550 of the environment of FIG. 5. Such data is leveraged by cognitive engine 650 to generate various patterns of behavior and expected activity for both users and security devices 550.

In one embodiment, connectivity module 615, confirms that all active security devices of security devices 550 of FIG. 5 are sending and receiving signals as intended. If a given security device is not sending or receiving signals as intended, i.e., there has been a breakdown in connectivity, then connectivity module 615 notifies reporting module 610 and alert/notification module 605.

In one embodiment, sensor listener module 625 confirms that all active security devices of security devices 550 of FIG. 5 are sending sensor data that matches a sensor data profile of a security profile stored in security profiles 635. If a given security device is not sending or receiving the expected sensor data, i.e., there has been a change in the sensor data that does not match the security profile stored in security profiles 635, then sensor listener module 625 notifies reporting module 610 and alert/notification module 605.

In one embodiment, cognitive engine 650 is a cognitive system that creates (i) patterns of activity for both users and devices and (ii) customized triggers for a plurality of actions/alerts based on a plurality of user attributes to create a more secure and tailored locking solution. Such attributes may include, but are not limited to user profiles, security profiles, assigned locks, assigned cables, user locations, and patterns of usage. In general, cognitive engine 650 uses gathered information, provided by sensor listener module 625, connectivity module 615, reporting module 610 and alert/notification module 605 to generate predicted activity and to modify the rules included in unlocking methods 620 based on that predicted activity. For example, it is determined that a given user typically works first shift and uses a given computing device 101 and a given mobile computing device 140. Cognitive engine 650 uses that gathered information to modify the rules included in unlocking methods 620 and then leverages those rules to control the locking and unlocking of security devices 550. In continuation with the example, an unlock request for a different computing device 101 is received from the given mobile computing device 140. Since there is an inconsistency, the rules in unlocking methods 620 dictate that (i) a trigger event has occurred, and (ii) a notification be sent to the user of the different computing device 101 and a security personnel.

Figure 7:
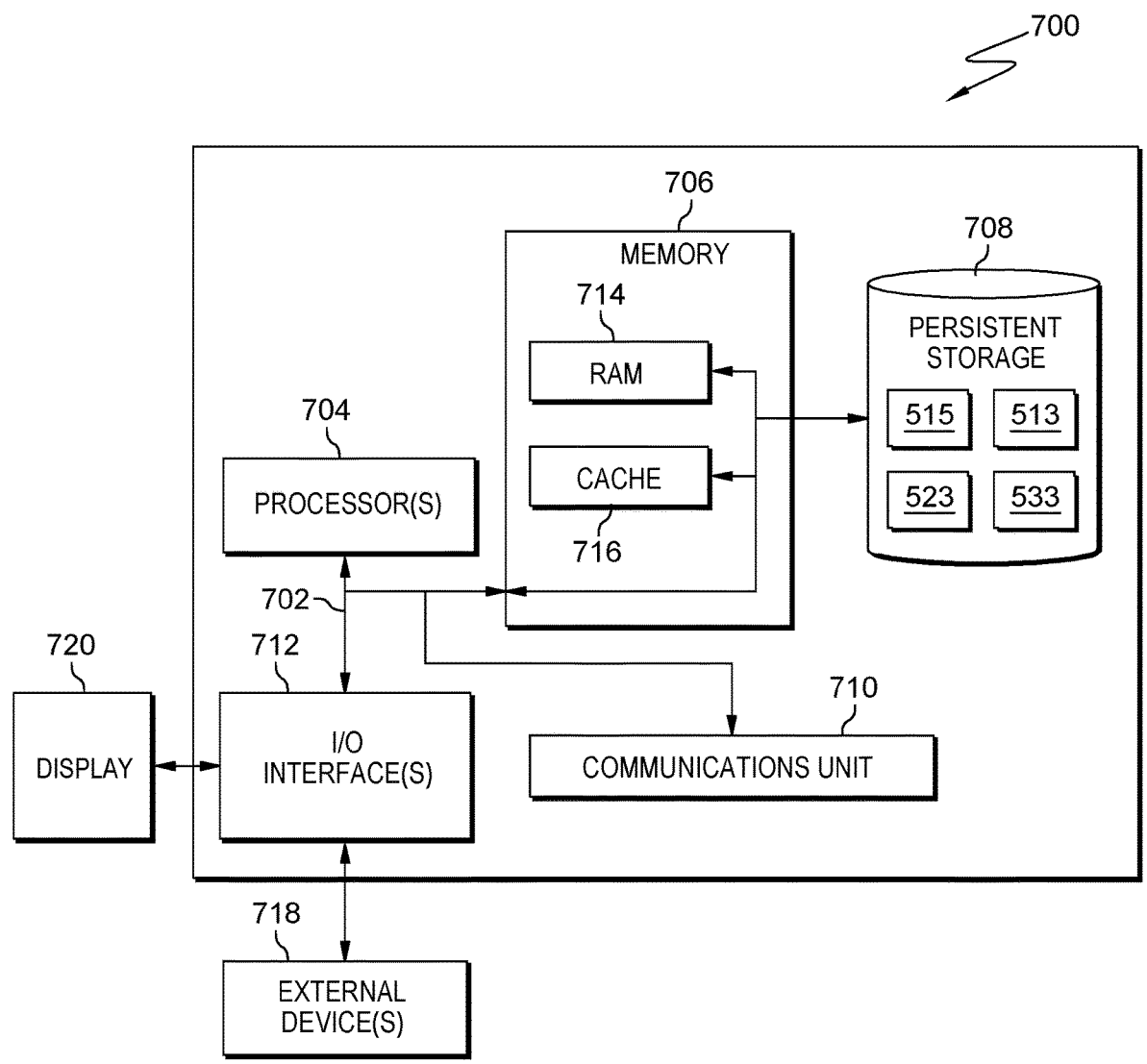
FIG. 7 depicts a block diagram of components of various computing devices of FIG. 5, in accordance with an exemplary embodiment of the present invention.

FIG. 7 depicts a block diagram, 700, of components of various computing devices of FIG. 5, for example computing device 510, computing device 520 and mobile computing device 540, in accordance with an illustrative embodiment of the present invention. It should be appreciated that FIG. 7 provides only an illustration of one implementation and does not imply any limitations with regard to the environments in which different embodiments may be implemented. Many modifications to the depicted environment may be made.

The computing devices includes communications fabric 702, which provides communications between computer processor(s) 704, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer-readable storage media. In this embodiment, memory 706 includes random access memory (RAM) 714 and cache memory 716. In general, memory 706 can include any suitable volatile or non-volatile computer-readable storage media.

Lock programs 513, 523 and 533, and data 515 are stored in persistent storage 708 for execution and/or access by one or more of the respective computer processors 704 via one or more memories of memory 706. In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer-readable storage medium that is also part of persistent storage 708.

Communications unit 710, in these examples, provides for communications with other data processing systems or devices, including resources of network 530. In these examples, communications unit 710 includes one or more network interface cards. Communications unit 710 may provide communications through the use of either or both physical and wireless communications links. Lock programs 513, 523 and 533, and data 515 may be downloaded to persistent storage 708 through communications unit 710.

I/O interface(s) 712 allows for input and output of data with other devices that may be connected to the computing devices of FIG. 5. For example, I/O interface 712 may provide a connection to external devices 718 such as a keyboard, keypad, a touch screen, and/or some other suitable input device. External devices 718 can also include portable computer-readable storage media such as, for example, thumb drives, portable optical or magnetic disks, and memory cards. Software and data used to practice embodiments of the present invention, for example lock programs 513, 523 and 533, and data 515, can be stored on such portable computer-readable storage media and can be loaded onto persistent storage 708 via I/O interface(s) 712. I/O interface(s) 712 also connect to a display 720.

Display 720 provides a mechanism to display data to a user and may be, for example, a computer monitor, or a television screen.

Figure 8:
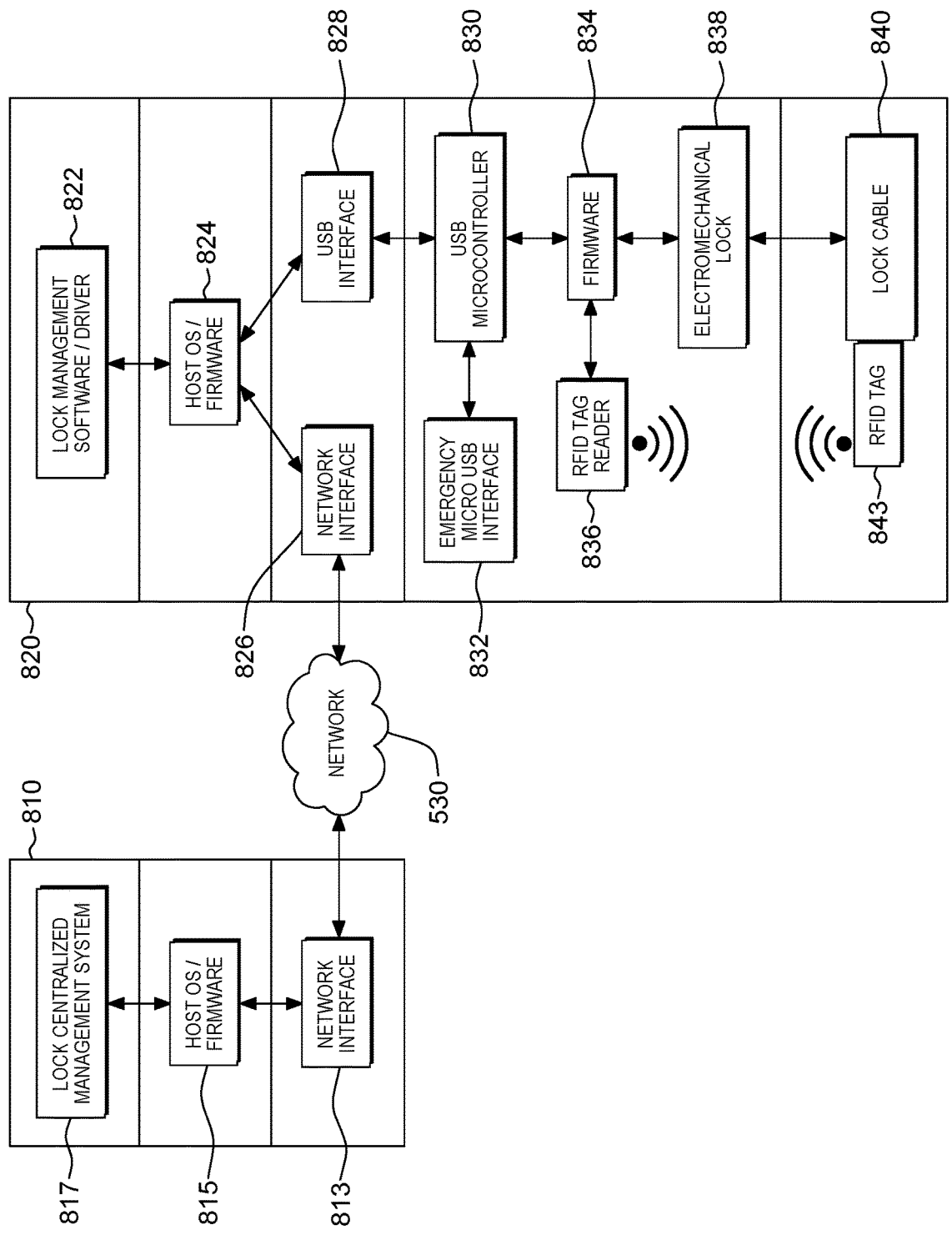
FIG. 8 is a component diagram illustrating certain communication pathways between certain hardware and software components that are included in various computing systems of FIG. 5.

FIG. 8 is a component diagram illustrating certain communication pathways between certain hardware and software components that are included in various computing systems of FIG. 5. FIG. 8 includes computing devices 810 and 820. Computing device 810 includes lock centralized management system 817, host OS (operating system)/firmware, and network interface 813. In general, computing devices 810 includes the functions and features of FIG. 6 and computing device 510 of FIG. 5. Likewise, computing device 820 includes the features and functionality of computing device 101, security device 105, retaining device 200, and base 211 seen in FIGS. 1 and 2, as well as those of computing device 520 of FIG. 5.

In this embodiment, lock centralized management system 817 functions following lock program 513, host OS (operating system)/firmware 815 is a local operating system program, and network interface 813 provides connectivity for computing device 810 to network 530.

In this embodiment, computing device 820 includes lock management software/driver 822, which functions following the description of lock program 523 to control the activation/deactivation of electromechanical lock 838 to lock onto/release lock cable 840, which includes RFID tag 843. As is understood by one having ordinary skill in the art, electromechanical lock 838 is one embodiment of security device 105, and lock onto/release lock cable 940 is one embodiment of retaining device 200.

In this embodiment, computing device 820 includes host OS (operating system)/firmware 824, which is a local operating system program. Computing device 820 also includes network interface 826 provides connectivity for computing device 820 to network 530. Computing device 820 further includes a USB interface 828 which is an embodiment of connection port 107, that is in communication with USB microcontroller 830. In this embodiment, USB microcontroller 830 is in communication with emergency micro USB interface 832, which provides an interface for one or more mobile computing devices 540. As depicted, computing device 820 includes firmware 834 which controls RFID tag reader 836 and electromechanical lock 838, which are included as part of security device 105 in some embodiments.

FIG. 9 illustrates operational processes, 900, for RFID tag registration for a lock program 513, executing on a computing device 810 within the environment of FIG. 8, in accordance with an exemplary embodiment of the present invention. In process 910, lock program 513 completes a user login to a lock remote management system. In some embodiments, this includes verification of both the requesting device as well as the user initiating the login. In process 915, lock program 513 receives a scan of an RFID tag 843 associated with a lock cable 840. In some embodiments, the scan includes recordation of a security code that is used by a retaining device 200, base 211, and security device 105, via lock programs 513, 523, and 533, to confirm the security of the connections between one or all of retaining device 200, base 211, and security device 105.

In process 920, lock program 513 populates the RFID tag details (identification number, passcodes etc.) in a database, such as in cables database 645. In some embodiments, this process includes storage of additional information such as a user, a location, a computing device, and a mobile computing device that are associated with the cable. For example, User A is assigned the cable and the records in data 515 are updated to reflect where User A will be using the cable, e.g., work on floor 3, aisle 2, cubicle 4 of an office building. In some embodiments, lock program 513 generates (i) a set of rules and (ii) a pattern of behavior for the authorized user that govern allowance of unlocking of the physical security device included in the first computing device via the mobile computing device. In some embodiments, lock program 513 permits a sending of a signal to unlock the physical security device based on a at least one rule and a current characteristic of the user matching a characteristic of the authorized user that is included in the pattern of behavior. For example, the set of rules specify that an authorized user may request a security override to unlock computing device 101, i.e., to release retaining device 200 from one or both of security device 105 and base 211, during normal business hours. Further, based on historical records, lock program 513 determines the expected time period during which a given authorized user typically is working. Since the request was received during normal business hours and the time period, lock program 513 permits a sending of a signal to unlock one or both of security device 105 and base 211 thereby releasing retaining device 200.

In decision process 925, lock program 513 determines whether the cable is a fixed cable or a portable cable. In general, a fixed cable is one that is attached to a base 211 such that it is not removable. In contrast, a portable cable is a cable that is not permanently fixed to a base and can be moved to a given desired location for use.

In process 930, lock program 513 initiates a work order to have the cable installed at the location associated with the user and/or provides the location of the cable to the user if the cable is already installed.

In process 935, lock program 513 provides the user with the cable, e.g., provides the user with a part number for that specific cable and instructions for receiving the cable.

FIG. 10 illustrates operational processes, 1000, for RFID tag identification for a lock program 523, executing on a computing device within the environment of FIG. 5, in accordance with an exemplary embodiment of the present invention.

In process 1010, lock program 523 determines that lock cable 840 has been plugged into computing device 820 based on reception of an RFID tag signal from RFID tag 843 by RFID tag reader 836.

In process 1015, lock program 523 reads the information stored in the RFID tag.

In process 1020, lock program 523 reports the RFID tag and lock status back to a remote management system, such as computing device 810. In some embodiments, lock program 523 periodically or continuously checks and updates the status of the RFID tag and lock status back to a remote management system. It is to be understood that, as described herein above, lock program 523 monitors the status of various components included in FIGS. 1-12 and sends updates to the remote management system accordingly. As such, a remote management system is notified if there is activity, either authorized or unauthorized, that meets the criteria set forth in the sets of rules of data 515. In some embodiments, as part of reporting the RFID tag information, lock program 523 monitors signals from the first computing device, wherein the signals indicate a status of (i) the physical security device, and (ii) one or both of the physical component that restricts the movement of the first computing device from a location, and a base that is secured to the physical component that restricts the movement of the first computing device. For example, lock program 523 monitors signals from one or a combination of computing device 101, security device 105, retaining device 200, and base 211.

In some embodiments, as part of the reporting and monitoring in process 1020, lock program 523 responds to a determination that a signal has been received that indicates the security device has been potentially tampered with by sending a message to the mobile device of the user that alerts the user to the potential tampering.

In process 1025, lock program 523 stores the RFID tag information in a local cache.

Figure 11:
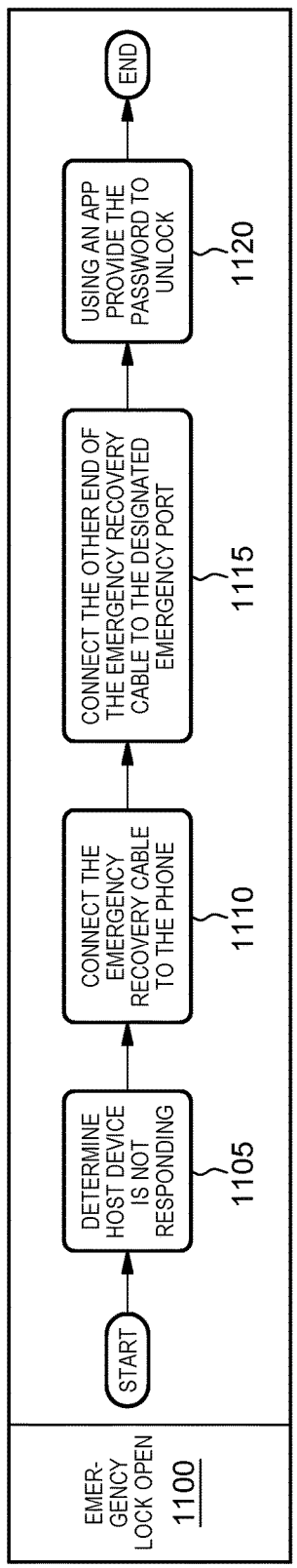
FIG. 11 illustrates operational processes for an emergency lock open procedure for a lock program, executing on a computing device within the environment of FIG. 8, in accordance with an exemplary embodiment of the present invention.

FIG. 11 illustrates operational processes for an emergency lock open procedure, 1100, for lock programs 513, 523, and 533 executing on computing devices within the environment of FIG. 5, in accordance with an exemplary embodiment of the present invention.

In process 1105, lock program 513 determines that a given host computing device, such as computing device 520, is not responding. In some embodiments, lock program 513 determines that a given host computing device is not responding based on a determination that an authorized user has requested an unlocking of a physical security device included in a first computing device. In some embodiments, lock program 513 determines that a given host computing device is not responding based on a received a request from a user to unlock the physical security device included in the first computing device. In some embodiments, lock program 513 determines that a user that sent the request is an authorized user, i.e., is authorized to request a remote unlock of the physical security device included in the first computing device, which enables removal of a physical component that restricts the movement of the first computing device from a location.

In some embodiments, lock program 513 determines that a user that sent the request to unlock the security device is an authorized user based on determinations that (i) the request from the user to unlock the physical security device included in the first computing device originated from the mobile computing device and (ii) that the mobile computing device is associated with both the authorized user and the first computing device.

In process 1110, lock program 513 sends a message to a mobile computing device 540 that includes instructions to connect an emergency recovery cable, e.g., a USB cable, from computing device 520 to mobile computing device 540.

In process 1115, lock program 513 determines that the instruction to connect the other end of the emergency recovery cable to the designated emergency port has been completed.

In process 1120, lock program 513 uses an application, such as lock program 533, on mobile computing device 540 to provide the password to security device 105 to initiate an unlock process to release retaining device 200. In one such embodiment, lock program 513 sends a signal to a mobile computing device of the user that is in communication with the first computing device. In one such embodiment, lock program 513 unlocks a physical security device included in the first computing device via the mobile computing device based on the signal.

Figure 12:
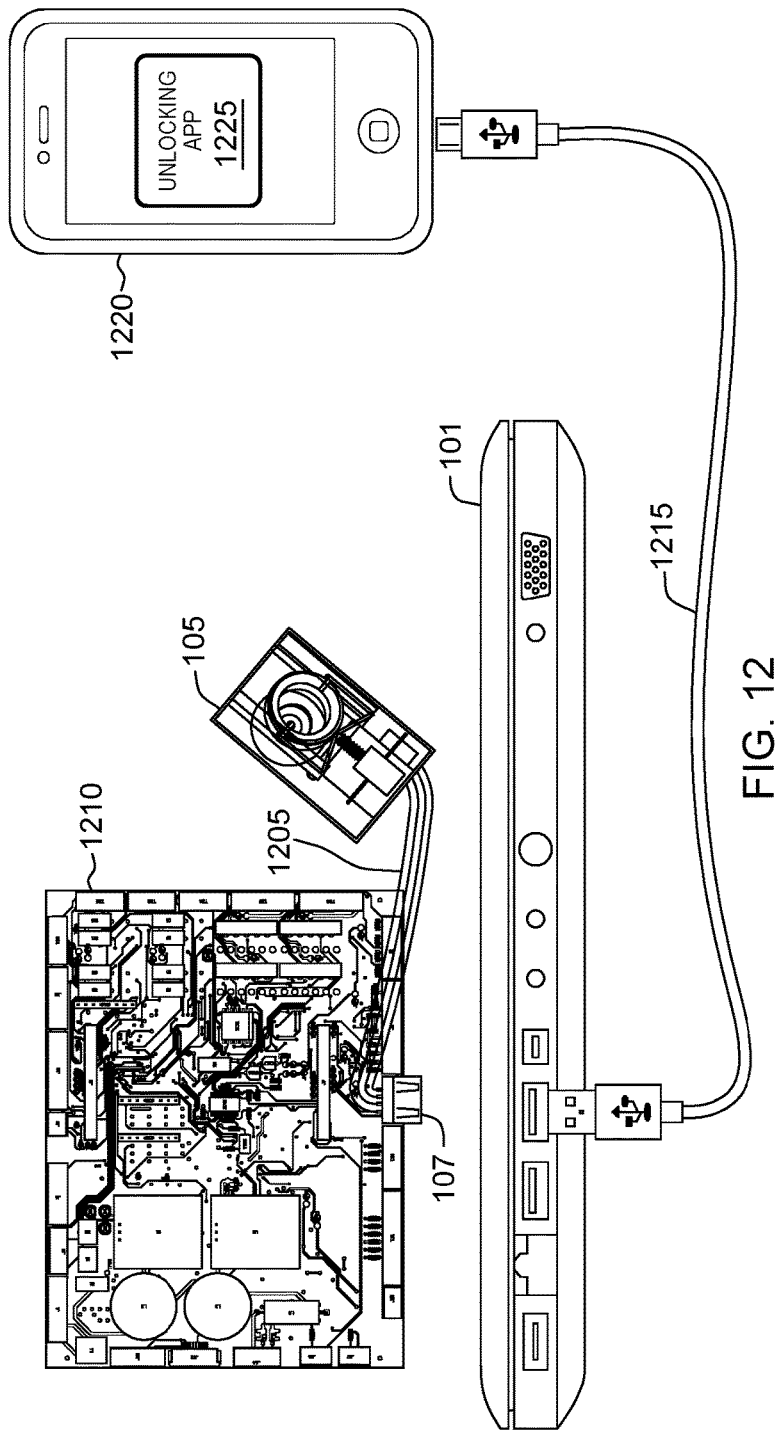
FIG. 12 depicts a diagram of certain components of various computing devices of FIG. 5, in accordance with an exemplary embodiment of the present invention.

FIG. 12 depicts a diagram of certain components of various computing devices of FIG. 5, in accordance with an exemplary embodiment of the present invention.

As shown in FIG. 12, security device 105 is integrated with a motherboard 1210 of computing device 101 via connectors 1205 that are connected to connection port 107. FIG. 12 further illustrates the connector 1215 that may be used to form a connection between smartphone 1220, which includes unlocking app 1225. In this embodiment, smartphone 1220 is an example of a mobile computing device 540.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as, for example, "Smalltalk" and the like may be subject to trademark rights in various jurisdictions throughout the world and are used here only in reference to the products or services properly denominated by the marks to the extent that such trademark rights may exist.

It is apparent that there has been provided approaches for providing remote lock and unlock management. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method comprising:
mechanically locking a computer including a physical security device to a retaining device so that an electrical connection between the physical security device and the retaining device is formed;
determining that the computer has not been subject to unauthorized removal by monitoring an electrical signal that is communicated through the electrical connection between the physical security device and the retaining device;
receiving, from a first user device of a first user and over a communication network, a request to unlock the computer from the retaining device;
receiving a user profile data set with the user profile data set including information associated with the first user relating to each of the following areas: activity, location, preferences and security profile;
analyzing the user profile data set to determine that the first user should be allowed access to the computer; and
sending, to the computer and over the communication network, an instruction to unlock the computer from the retaining device;
wherein:
the retaining device includes a transmitter portion that includes a radio frequency identification (RFID) tag that is activated upon formation of the electrical connection between the physical security device and the retaining device, and
the transmitter portion further includes an encryption/decryption chip that sends signals to the computer to inhibit bypassing of the electrical connection between the physical security device and the retaining device.

2. A computer program product comprising:
a set of non-transitory storage device(s); and
computer code stored collectively in the set of storage device(s), with the computer code including data and instructions to cause a processor(s) set to perform at least the following operations:
mechanically locking a computer including a physical security device to a retaining device so that an electrical connection between the physical security device and the retaining device is formed,
determining that the computer has not been subject to unauthorized removal by monitoring an electrical signal that is communicated through the electrical connection between the physical security device and the retaining device,
receiving, from a first user device of a first user and over a communication network, a request to unlock the computer from the retaining device,
receiving a user profile data set with the user profile data set including information associated with the first user relating to each of the following areas: activity, location, preferences and security profile,
analyzing the user profile data set to determine that the first user should be allowed access to the computer, and
sending, to the computer and over the communication network, an instruction to unlock the computer from the retaining device,
wherein:
the retaining device includes a transmitter portion that includes a radio frequency identification (RFID) tag that is activated upon formation of the electrical connection between the physical security device and the retaining device, and
the transmitter portion further includes an encryption/decryption chip that sends signals to the computer to inhibit bypassing of the electrical connection between the physical security device and the retaining device.

3. A computer system comprising:
a processor(s) set;
a set of storage device(s); and
computer code stored collectively in the set of storage device(s), with the computer code including data and instructions to cause the processor(s) set to perform at least the following operations:
mechanically locking a computer including a physical security device to a retaining device so that an electrical connection between the physical security device and the retaining device is formed,
determining that the computer has not been subject to unauthorized removal by monitoring an electrical signal that is communicated through the electrical connection between the physical security device and the retaining device, receiving, from a first user device of a first user and over a communication network, a request to unlock the computer from the retaining device, receiving a user profile data set with the user profile data set including information associated with the first user relating to each of the following areas: activity, location, preferences and security profile, analyzing the user profile data set to determine that the first user should be allowed access to the computer, and sending, to the computer and over the communication network, an instruction to unlock the computer from the retaining device, wherein:

the retaining device includes a transmitter portion that includes a radio frequency identification (RFID) tag that is activated upon formation of the electrical connection between the physical security device and the retaining device, and the transmitter portion further includes an encryption/decryption chip that sends signals to the computer to inhibit bypassing of the electrical connection between the physical security device and the retaining device.

* * * * *